United States Patent
Park et al.

(10) Patent No.: US 10,045,196 B2
(45) Date of Patent: Aug. 7, 2018

(54) ASSOCIATION METHOD FOR DATA TRANSMISSION IN WIRELESS COMMUNICATION SYSTEM AND DEVICE USING SAME

(71) Applicant: LG ELECTRONICS INC., Seoul (KR)

(72) Inventors: Giwon Park, Seoul (KR); Byungjoo Lee, Seoul (KR); Hyunhee Park, Seoul (KR); Dongcheol Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/551,066

(22) PCT Filed: Feb. 23, 2016

(86) PCT No.: PCT/KR2016/001751
§ 371 (c)(1),
(2) Date: Aug. 15, 2017

(87) PCT Pub. No.: WO2016/137198
PCT Pub. Date: Sep. 1, 2016

(65) Prior Publication Data
US 2018/0035277 A1 Feb. 1, 2018

Related U.S. Application Data

(60) Provisional application No. 62/119,820, filed on Feb. 24, 2015, provisional application No. 62/120,367, filed on Feb. 24, 2015, provisional application No. 62/121,490, filed on Feb. 26, 2015, provisional application No. 62/129,969, filed on Mar. 9, 2015.

(51) Int. Cl.
H04M 1/66 (2006.01)
H04W 8/00 (2009.01)
H04W 12/06 (2009.01)

(52) U.S. Cl.
CPC .......... H04W 8/005 (2013.01); H04W 12/06 (2013.01)

(58) Field of Classification Search
CPC .................................................. H04W 8/005
See application file for complete search history.

(56) References Cited

U.S. PATENT DOCUMENTS

2014/0082205 A1* 3/2014 Abraham ............ H04L 65/1069
709/227
2016/0128113 A1* 5/2016 Qi ........................ H04W 76/023
370/329

FOREIGN PATENT DOCUMENTS

| CN | 103200191 A | 7/2013 |
| EP | 2835992 A2 | 2/2015 |
| WO | 2014/168640 A1 | 10/2014 |
| WO | 2014/178605 A1 | 11/2014 |

\* cited by examiner

Primary Examiner — Justin Lee
(74) Attorney, Agent, or Firm — Dentons US LLP

(57) ABSTRACT

An association method for data transmission between devices in a neighbor awareness network (NAN), and a device using the same are provided. A first NAN device transmits, to a second NAN device, a service discovery frame having a service identifier (ID) and association interval information, and transmits an authentication request for requesting authentication at a time indicated by the association interval information.

8 Claims, 6 Drawing Sheets

ASSOCIATION METHOD FOR DATA TRANSMISSION IN WIRELESS COMMUNICATION SYSTEM AND DEVICE USING SAME

CROSS-REFERENCE TO RELATED APPLICATIONS

This application is the National Stage filing under 35 U.S.C. 371 of International Application No. PCT/KR2016/001751, filed on Feb. 23, 2016, which claims the benefit of U.S. Provisional Applications No. 62/119,820 filed on Feb. 24, 2015, No. 62/120,367 filed on Feb. 24, 2015, No. 62/121,490 filed on Feb. 26, 2015 and No. 62/129,969 filed on Mar. 9, 2015, the contents of which are all hereby incorporated by reference herein in their entirety.

BACKGROUND OF THE INVENTION

Field of the Invention

The present invention relates to wireless communication, and more particularly, to an association method for data transmission in a wireless communication system, and a device using the same.

Related Art

Generally, a wireless communication system allows communication between user equipments (UEs) via a management medium, such as a base station or an access point (AP). The management medium is responsible for scheduling for data communication.

In order to secure flexibility in communication, various protocols for direct communication between devices without a management medium have been proposed. A neighbor awareness network (NAN) is a specification established by the Wi-Fi Alliance (WFA) based on the Wi-Fi standard. The NAN specification specifies synchronization and discovery procedures between devices in a frequency band of 2.5 GHz or 5 GHz.

Currently, the NAN specification does not support data communication between devices. A protocol is provided for direct data transmission between neighboring devices.

SUMMARY OF THE INVENTION

The present invention provides an association method for data transmission in a neighbor awareness network (NAN) and a device using the same.

In an aspect, an association method for data transmission between devices in a neighbor awareness network (NAN) is provided. The method includes transmitting, by a first NAN device, a service discovery frame to a second NAN device, the service discovery frame including a service identifier (ID) and association interval information, and transmitting, by the first NAN device, an authentication request for requesting authentication to the second NAN device at a time indicated by the association interval information.

In another aspect, a device for a neighbor awareness network (NAN) includes a transceiver configured to transmit and receive a radio signal, and a processor coupled to the transceiver. The processor is configured to control the transceiver to transmit a service discovery frame to a second NAN device, the service discovery frame including a service identifier (ID) and association interval information, and control the transceiver to transmit an authentication request for requesting authentication to the second NAN device at a time indicated by the association interval information.

It is possible to reduce the power consumption of a device and to transmit traffic data in a neighbor awareness network (NAN).

DESCRIPTION OF EXEMPLARY EMBODIMENTS

A neighbor awareness network (NAN) is a specification established by the Wi-Fi Alliance (WFA) based on the Wi-Fi standard. An NAN device is a device that supports the NAN specification. The NAN device may support various communication protocols and may be part of a station (STA) or part of an access point (AP). The STA may be fixed or mobile and may be referred to as a different term, such as a user equipment (UE), a mobile station (MS), a mobile terminal (MT), a user terminal (UT), a subscriber station (SS), a personal digital assistant (PDA), a wireless modem, a handheld device, or the like.

The NAN device may operate in a frequency band of 2.5 GHz or 5 GHz and may exchange information based on the Institute of Electrical and Electronics Engineers (IEEE) 802.11a/b/g/n/ac protocols.

The NAN device may retrieve a service of a neighboring device using an NAN protocol, may run an application, and may connect to a wireless local area network (WLAN) or another network, thereby using the retrieved service.

Figure 1:
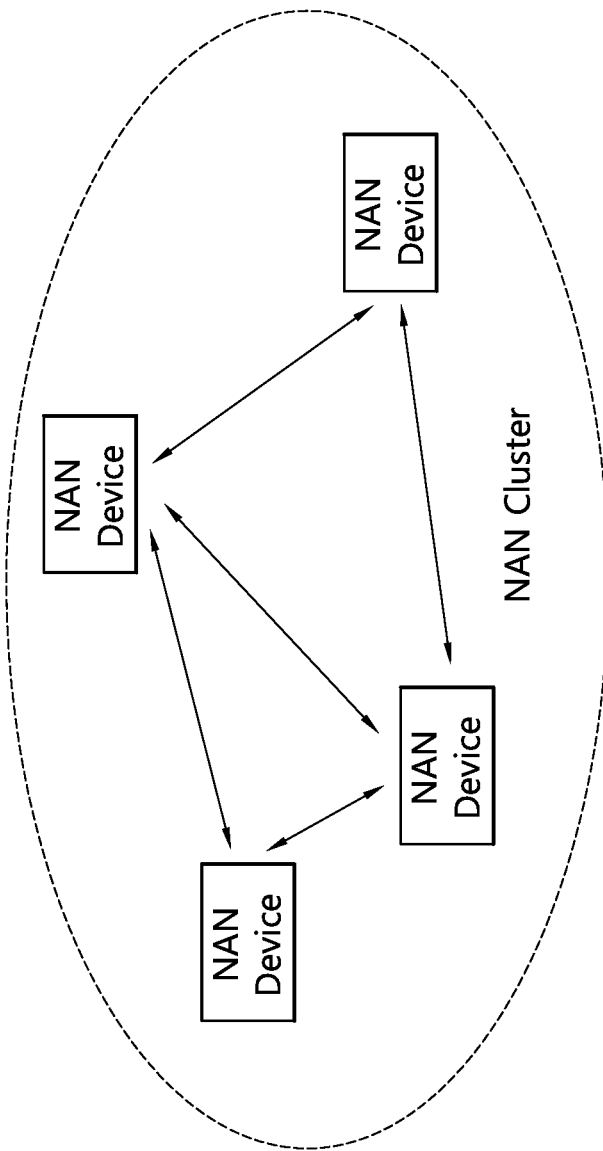
FIG. 1 shows an example of neighbor awareness network (NAN) topology.

FIG. 1 shows an example of NAN topology.

An NAN cluster may be a set of NAN devices that share a set of NAN parameters and synchronize to the same discovery window schedule. NAN devices participating in the same NAN cluster synchronize to a communal clock. An NAN parameter may include at least one of discovery window duration, a discovery window interval, and an NAN channel. A discovery window interval refers to a gap between consecutive discovery windows.

An NAN network may include at least one NAN cluster. An NAN device may participate in one or more NAN clusters.

An NAN device in an NAN cluster may operate as a master role or a non-master role. An NAN device operating as a master role may transmit a synchronization beacon frame and a discovery beacon frame. An NAN device operating as a non-master role in a synchronous state may not transmit a discovery beacon frame. An NAN device operating as a non-master role in an asynchronous state may not transmit a synchronization beacon frame and a discovery beacon frame. All NAN devices may transmit a service discovery frame.

A synchronization beacon frame is used to synchronize NAN devices in an NAN cluster. A discovery beacon frame is used for advertisement such that an NAN device not joining an NAN cluster discovers the cluster. A service discovery frame is used to exchange information on a service between NAN devices.

Figure 2:
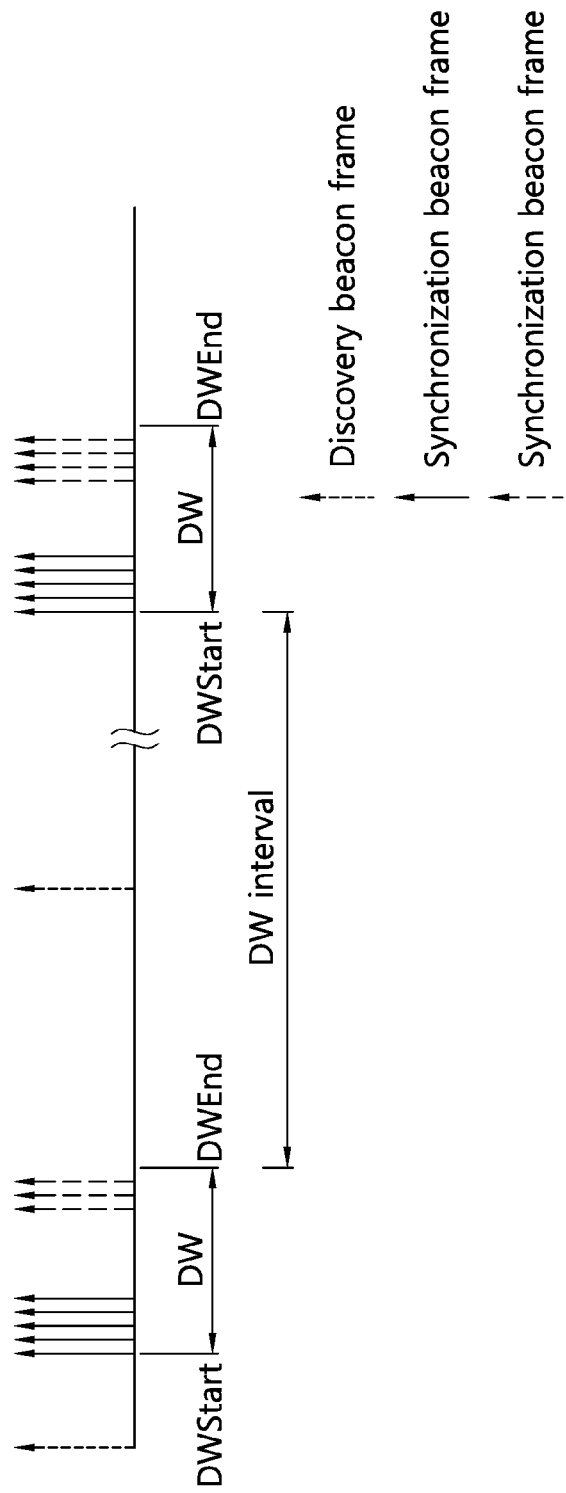
FIG. 2 shows an operation in a discovery window.

FIG. 2 shows an operation in a discovery window.

A discovery window (DW) may be a time and channel on which NAN devices converge.

During a discovery window, one or more NAN devices may transmit a synchronization beacon frame so that all NAN devices in an NAN cluster may be synchronized. One NAN device may transmit one synchronization beacon frame during one discovery window.

Between discovery windows, one or more NAN devices may transmit a discovery beacon frame so that the NAN devices may discover an NAN cluster.

During a discovery window, an NAN device may transmit a service discovery frame on the basis of contention. The NAN device may start a backoff timer set to a random value, and may transmit the service discovery frame when the value of the backoff timer is 0.

The NAN specification provides protocols on synchronization and discovery between NAN devices only and does not stipulate authentication and association processes for data transmission.

Authentication and association processes for data transmission between NAN devices are proposed.

An NAN device may include an NAN layer and an application layer as functional architectures. The NAN layer transmits or receives a frame according to the NAN specification. The application layer is an upper layer of the NAN layer and manages a service and an application.

Figure 3:
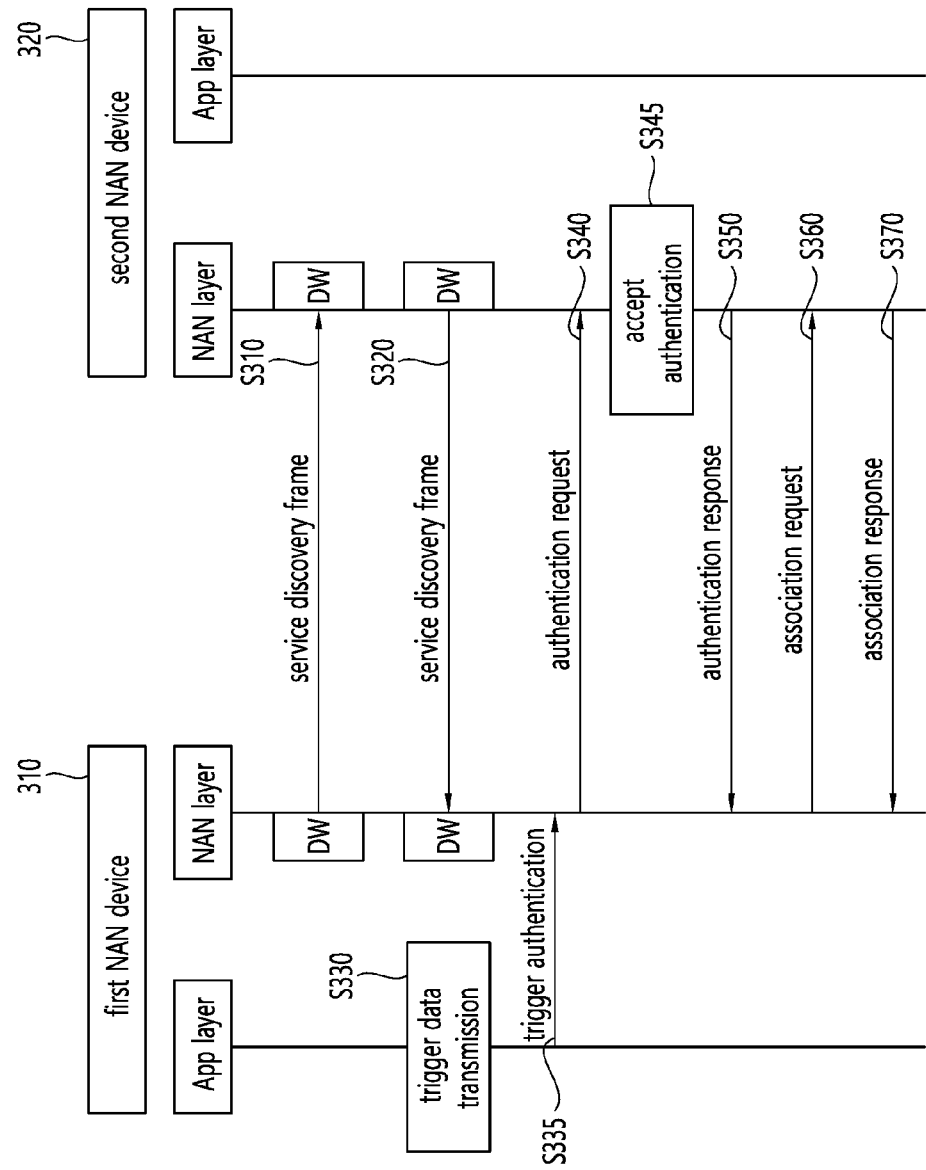
FIG. 3 shows an association method according to an embodiment of the present invention.

FIG. 3 shows an association method according to an embodiment of the present invention.

A first NAN device 310 and a second NAN device 320 exchange a service discovery frame during a discovery window (DW) (S310 and S320). The service discovery frame includes information on at least one of the identifier (ID) of an NAN device, the service ID of the NAN device, and an association interval. The association interval may include information on transmission time of an authentication request/response and/or an association request/response.

Suppose that data transmission is triggered in an application layer of the first NAN device 310 (S330). For example, a user application program is run by a user. The application layer triggers authentication and association processes to an NAN layer (S335). An application ID to identify an application may be provided to the NAN layer.

The first NAN device 310 sends an authentication request to the second NAN device 320 (S340). The authentication request may include at least one of the ID of the first NAN device, a service ID, and an application ID.

Alternatively, when data transmission is triggered, a service discovery process may be performed. After the service discovery process succeeded, an authentication process may be initiated.

The second NAN device 320 determines whether to approve authentication (S345). The second NAN device 320 may store a white list for approving authentication and a black list for disapproving authentication. The second NAN 320 may approve authentication when the first NAN device 310 belongs to the white list.

When authentication is approved, the second NAN device 320 sends an authentication response (S350). The authentication response may include at least one of the ID of the second NAN device 320, the ID of a received service, and the ID of a received application.

When the authentication process is completed, an association process is triggered. The first NAN device 310 sends an association request to the second NAN device 320 (S360). The association request may include at least one of the ID of the first NAN device, a service ID, and an application ID.

The second NAN device 320 compares previously received information with information included in the association request, and sends an association response if the pieces of information are matched (S370). For example, the second NAN device 320 compares the ID of the NAN device and the service ID in the authentication request with the ID of the NAN device and the service ID in the association request, and may send an association response indicating that association is successful if the ID of the NAN device and the service ID in the authentication request respectively match the ID of the NAN device and the service ID in the association request.

The NAN device ID, the service ID, and the application ID may be defined in individual fields, and combinations thereof may be defined in one or more fields.

In the authentication process, the service ID may be used to create an encryption key for authentication.

Figure 4:
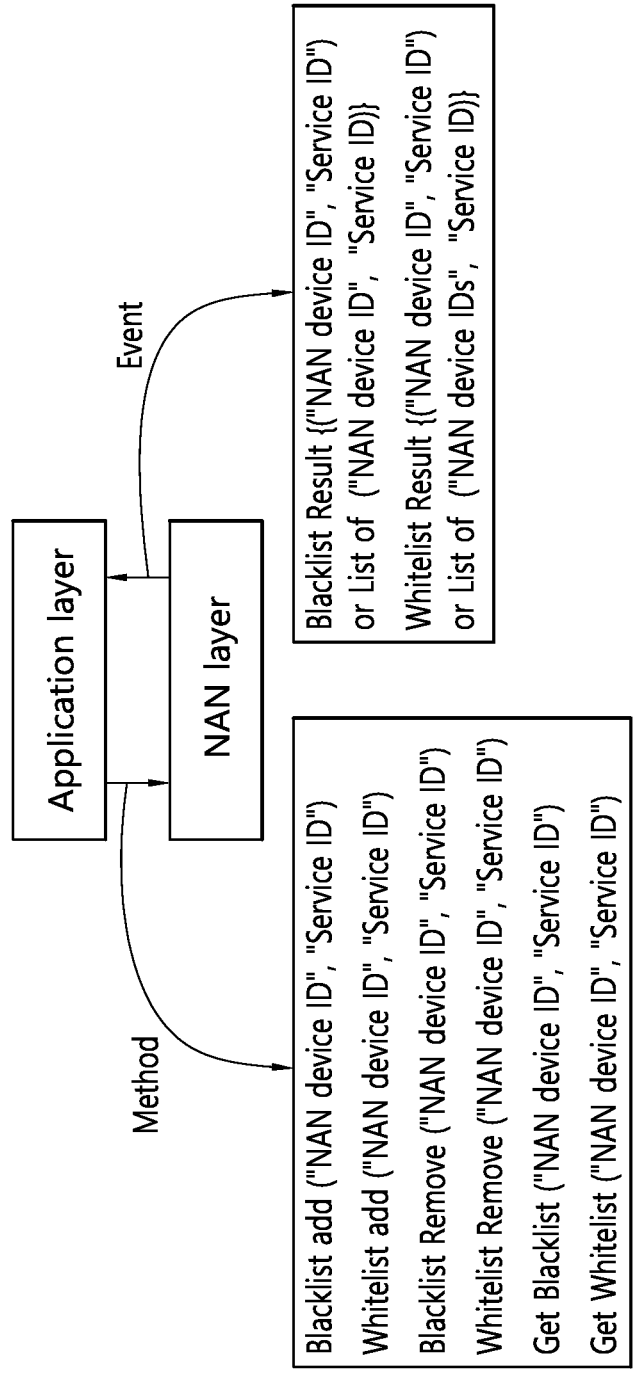
FIG. 4 shows an example of a procedure for determining authentication approval.

FIG. 4 shows an example of a procedure for determining authentication approval.

Primitives for determining authentication approval are as follows. A method primitive is a primitive for requesting an action from an application layer to an NAN layer. An event primitive is a primitive for requesting an action from the NAN layer to the application layer.

In an authentication process, a white list and a black list are used to determine whether to approve authentication.

The white list includes a device of which the authentication is to be approved. The device may be identified by a combination of an NAN device ID and a service ID. The authentication of even a particular NAN device may be approved or disapproved depending on a sub type. The blacklist includes a device of which the authentication is to be disapproved. The device may be identified by a combination of an NAN device ID and a service ID.

The method primitive includes Blacklist add( ) Whitelist add( ) Blacklist Remove( ) Whitelist Remove( ) Get Blacklist( ) and Get Whitelist( ) Blacklist add( ) and Whitelist add( ) are for adding device information to the respective lists. Blacklist Remove( ) and Whitelist Remove( ) are for removing device information from the respective lists. These are used to update the contents of the respective lists. Get Blacklist( ) and Get Whitelist( ) are used to obtain the contents of the respective lists. The event primitive includes Blacklist Result( ) and Whitelist Result( ) Blacklist Result( ) and Whitelist Result( ) indicate whether an NAN device belongs to the respective lists.

An NAN device determines, based on the black list and the white list, whether to accept an authentication request with respect to the ID and the service ID of an NAN device that has sent the authentication request. If the authentication request is accepted, the NAN device transmits an authentication response to successfully complete the authentication process.

Figure 5:
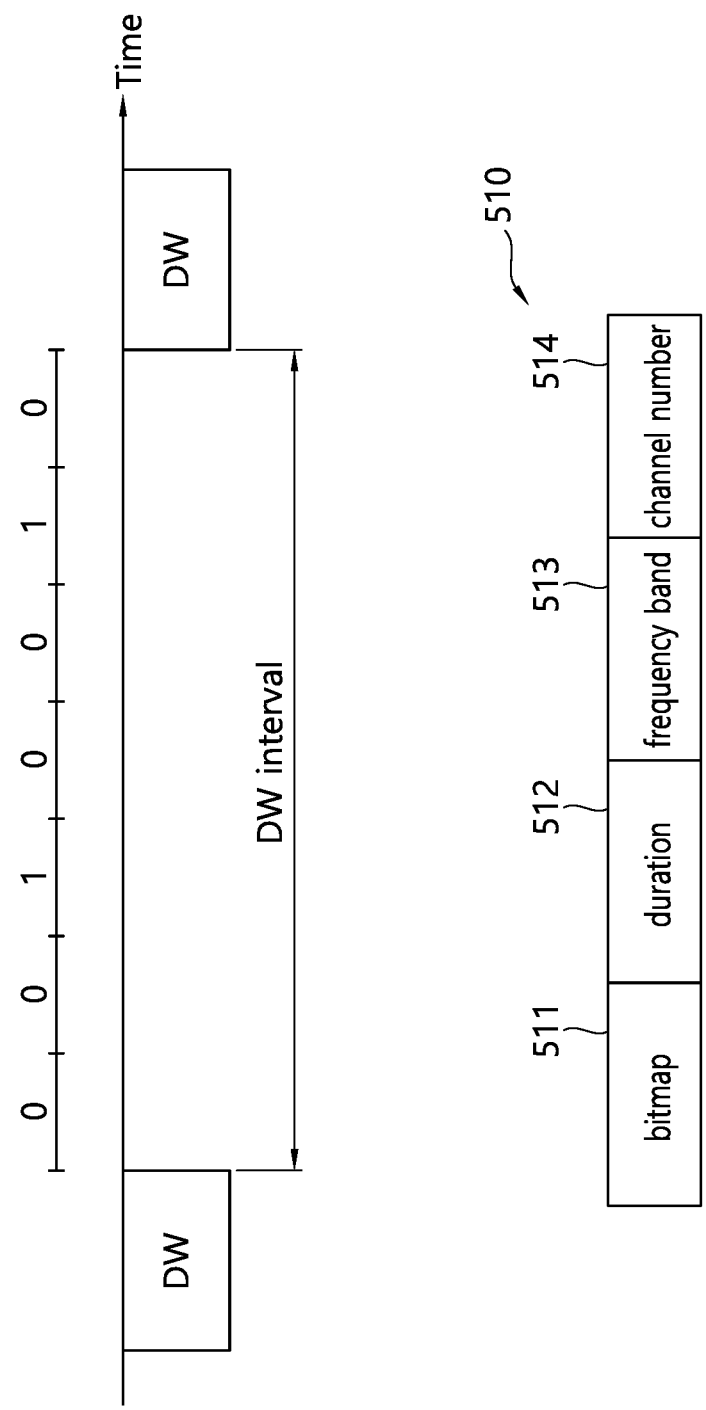
FIG. 5 shows an example of association interval information according to an embodiment of the present invention.

FIG. 5 shows an example of association interval information according to an embodiment of the present invention.

A service discovery frame transmitted during a discovery window (DW) may include association interval information 510. The association interval 510 may include information on the transmission time of an authentication request/response and/or an association request/response.

The association interval 510 may include at least one of a bitmap field 511, a duration field 512, a frequency band field 513, and a channel number field 514. The bitmap field 511 indicates the time at which a frame (for example, an authentication request/response and/or association request/response) is transmitted. The duration field 512 indicates the length of an interval in which the frame is transmitted in association with the bitmap field 511. The frequency band field 513 indicates a frequency band (for example, 2.5 GHz or 5 GHz) in which the frame is transmitted. The channel number field 514 indicates a channel through which the frame is transmitted in the frequency band.

The bitmap field 511 may indicate time within the discovery window. Alternatively, the bitmap field 511 may indicate time within a discovery window interval.

More specifically, suppose that the bitmap field 511 indicates time within the discovery window interval. From the end of the discovery window, N intervals are defined by the interval indicated by the duration field 512. The bitmap field 511 has N bits, and each bit may indicate whether a frame can be transmitted in a corresponding interval. For example, as shown in the drawing, when seven intervals are defined and the bitmap field 511 has '0010010,' it is possible to transmit a frame in third and sixth intervals.

Figure 6:
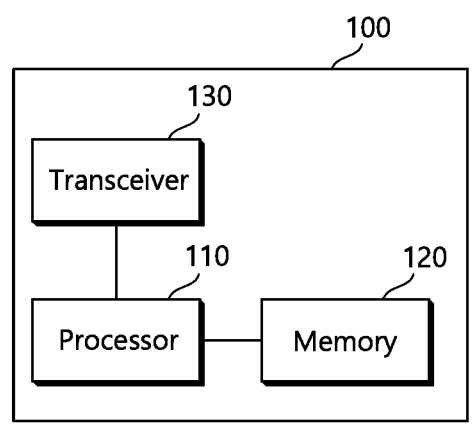
FIG. 6 is a block diagram illustrating a device to implement the embodiments of the present invention.

FIG. 6 is a block diagram illustrating a device to implement the embodiments of the present invention.

A device 100 may perform an operation of the first NAN device 310 or the second NAN device 320 of FIG. 3. The device 100 includes a processor 110, a memory 120, and a transceiver 130. The memory 120 is coupled to the processor 110 and stores various instructions that are executed by the processor 110. The transceiver 130 is coupled to the processor 110 and transmits and/or receives radio signals. The processor 110 implements the proposed functions, processes and/or methods. In the embodiments described above, the processor 110 implements the NAN protocols, and may implement a discovery process, an authentication process, and/or an association process. When the above-described embodiments are implemented by software instructions, the instructions may be stored in the memory 120 and may be executed by the processor 110, thereby performing the operations described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. An association method for data transmission between devices in a neighbor awareness network (NAN), the method comprising:
   transmitting, by a first NAN device, a first service discovery frame to a second NAN device during a first discovery window (DW), wherein the first service discovery frame includes a first service identifier (ID) of the first NAN device and first association interval information regarding at least one transmission time for at least one first frame to be transmitted by the first NAN device during a DW interval, and wherein the DW interval corresponds to a time interval between the first DW and a second DW that is subsequent to the first DW;
   receiving, by the first NAN device, a second service discovery frame from the second NAN device during the first DW, wherein the second service discovery frame includes a second service ID of the second NAN device and second association interval information regarding at least one transmission time for at least one second frame to be transmitted by the second NAN device during the DW interval;
   transmitting, by the first NAN device, an authentication request frame to the second NAN device during the DW interval when data transmission to the second NAN device is triggered from an upper layer of the first NAN device, wherein the authentication request frame is transmitted at a transmission time indicated by the first association interval information; and
   receiving, by the first NAN device, an authentication response frame from the second NAN device during the DW interval when the authentication request frame is accepted from the second NAN device, wherein the authentication response frame is transmitted at a transmission time indicated by the second association interval information; and
   transmitting, by the first NAN device, an association request frame for requesting association to the second NAN device during the DW interval after receiving the authentication response frame, wherein the association request frame is transmitted at a transmission time indicated by the first association interval information.

2. The method of claim 1, wherein the first association interval information comprises a bitmap indicating at least one interval during which transmission of the authentication request frame is possible among N intervals corresponding to the DW interval.

3. The method of claim 2, wherein the first association interval information further comprises a duration field indicating a length of each of the N intervals.

4. The method of claim 1, wherein the authentication request comprises information on the first service ID.

5. The method of claim 1, further comprising:
   transmitting, by the first NAN device, an association request for requesting association to the second NAN device.

6. A first a neighbor awareness network (NAN) device comprising:
   a transceiver configured to transmit and receive a radio signal; and
   a processor coupled to the transceiver and configured to:
   control the transceiver to transmit a first service discovery frame to a second NAN device during a first discovery window (DW), wherein the first service discovery frame includes a first service identifier (ID) of the first NAN device and first association interval information regarding at least one transmission time for at least one first frame to be transmitted by the first NAN device during a DW interval, and wherein the DW interval corresponds to a time interval between the first DW and a second DW that is subsequent to the first DW;

control the transceiver to receive a second service discovery frame from the second NAN device during the first DW, wherein the second service discovery frame includes a second service ID of the second NAN device and second association interval information regarding at least one transmission time for at least one second frame to be transmitted by the second NAN device during the DW interval;

control the transceiver to transmit an authentication request frame to the second NAN device during the DW interval when data transmission to the second NAN device is triggered from an upper layer of the first NAN device, wherein the authentication request frame is transmitted at a transmission time indicated by the first association interval information;

control the transceiver to receive an authentication response frame from the second NAN device during the DW interval when the authentication request frame is accepted from the second NAN device, wherein the authentication response frame is transmitted at a transmission time indicated by the second association interval information; and control the transceiver to transmit an association request frame for requesting association to the second NAN device during the DW interval after receiving the authentication response frame, wherein the association request frame is transmitted at a transmission time indicated by the first association interval information.

7. The device of claim 6, wherein the first association interval information comprises a bitmap indicating at least one interval during which transmission of the authentication request frame is possible among N intervals corresponding to the DW interval.

8. The device of claim 7, wherein the first association interval information further comprises a duration field indicating a length of each of the N intervals.

* * * * *